(12) United States Patent
Martinez et al.

(10) Patent No.: US 6,168,301 B1
(45) Date of Patent: Jan. 2, 2001

(54) WHEEL LUMINAIRE

(76) Inventors: Marvin R. Martinez, 43 Royal Crest Dr., Apt. C, Pueblo, CO (US) 81005; Edward Martinez, 3133 Morris, Pueblo, CO (US) 81008

( * ) Notice: Under 35 U.S.C. 154(b), the term of this patent shall be extended for 0 days.

(21) Appl. No.: 09/266,172

(22) Filed: Mar. 10, 1999

Related U.S. Application Data

(60) Provisional application No. 60/082,855, filed on Apr. 17, 1998, now abandoned.

(51) Int. Cl.[7] .................................................. B60Q 3/04
(52) U.S. Cl. ........................... 362/500; 362/42; 362/549; 362/800
(58) Field of Search .................................. 362/500, 800, 362/42, 549, 192, 193, 473

(56) References Cited

U.S. PATENT DOCUMENTS

| | | | |
|---|---|---|---|
| 4,800,469 | * | 1/1989 | Leon ........................................ 362/72 |
| 5,530,630 | * | 6/1996 | Williams, Jr. ............................ 362/78 |
| 5,800,038 | * | 9/1998 | Aichele .................................... 362/31 |
| 5,833,348 | * | 11/1998 | Bailey, Jr. ............................... 362/72 |

* cited by examiner

Primary Examiner—Sandra O'Shea
Assistant Examiner—John Anthony Ward
(74) Attorney, Agent, or Firm—Ramon L. Pizarro; Edwin H. Crabtree

(57) ABSTRACT

A system for illuminating a wheel on a vehicle, the wheel having a concave area adapted for mounting around a wheel hub attached to stationary structure on the vehicle, the vehicle having an electrical power source. The system includes a contact ring that includes a circular backing ring of an electrically insulating material and a layer of electrically conductive material over the backing ring. The contact ring is flexibly supported from the concave area of the wheel where a contact brush mounted from the stationary structure of the vehicle makes contact with the layer of electrically conductive material on the contact ring. At least one electrical light emitting device is electrically connected to the layer of electrically conductive material on the contact ring, so that electrical power from the power source reaches the light emitting device through the contact brush and through the contact ring.

13 Claims, 3 Drawing Sheets

WHEEL LUMINAIRE

REFERENCE TO RELATED APPLICATIONS

This application is a continuation of, and claims the benefit of, my provisional application having Ser. No. 60/082,855, filed Apr. 17, 1998, now abandoned.

BACKGROUND OF THE INVENTION (a) Field of the Invention

This invention generally relates to a system for illuminating rotating objects. More particularly, but not by way of limitation, to a system for illuminating wheels and the like.

(b) Discussion of Known Art

The appeal of illuminating rotating objects, such as the wheel of a vehicle, has long been recognized. Accordingly, many devices have been developed to meet this need to provide the pleasing appearance of rotating illumination on wheels or the like. One such device is taught in U.S. Pat. No. 1,539,394 to Leeman. The Leeman patent discloses the use of a contact ring which is permanently attached to the wheel of a vehicle. Unfortunately, however, the Leeman patent does not provide the ordinary artisan with guidance as to how mount this contact ring so that the wheel does not have to be modified. Perhaps more importantly, Leeman does not provide the necessary guidance to avoid problems associated with the need to dissipate the heat generated by the friction associated with the constant rubbing of the brush against the contact ring.

Another device that serves for providing illumination to a wheel is taught in U.S. Pat. No. 2,083,514 to Brown. The Brown patent teaches the use of a contact ring and brush assembly which cooperate with hollowed out fasteners that are used to provide a path for electrical conductors that extend to a light bulb mounted in a hub cap over the wheel. The contact ring of the Brown device is fastened against the wheel with the use of these hollow fasteners. A significant disadvantage of this system, aside from the need to provide hollow bolts, is that the contact ring is held against the wheel by means of the fasteners that hold the wheel against the wheel hub. Additionally, the contact ring must be electrically insulated in order to prevent a short circuiting of the current being provided for the illumination of the wheel. Accordingly, the stacking of a contact ring on top of an insulating material, which in turn is stacked on top of the wheel creates significant problems associated with the stability of the overall structure and the bending stresses introduced into the fasteners due to the distances introduced by the stacking of several components.

Another approach at illuminating the wheel of a vehicle is taught in U.S. Pat. No. 3,099,401 to Bell. The Bell invention mounts a brush to the wheel spindle of the vehicle. The brush contacts a contact ring or track that is mounted against the drum of the brake. The Bell invention, however, suffers from the disadvantage that the contact ring or track must be made such that its radius matches the radius of the drum on which it is mounted. Additionally, the use of an insulating material and a series of screws threaded directly into the brake drum can lead to serious fatigue or similar problems associated with the heating of the brake drum during operation.

Another known device is described in U.S. Pat. No. 3,113,727 to Bradway. The Bradway device provides a solution to the problems associated with illuminating hub caps. Towards this end, the Bradway invention includes hollow studs and a contact rig that mounts against the interior of the break drums. The Bradway invention uses the hollow studs to support fasteners that are used to hold the contact ring against the drum. This arrangement solves many of the thick stack up problems associated with the Brown device, but is severely limited in that the structure on which the Bradway device attaches has become increasingly unpopular in modern automobiles. Accordingly, the applicability of the Bradway device continues to dwindle.

Still another approach at the problem of how to illuminate rotating components includes U.S. Pat. No. 3,340,389 to Senseman. The Senseman device uses hollow studs to support fasteners which in turn support the contact ring and circuitry that leads to light bulbs mounted on the wheel. The similarities of the Senseman structure and the Bradway structure cause similar limitations in the Senseman device as are found in the Bradway device.

More recent approaches at the problem of illuminating wheels and the like include U.S. Pat. No. 4,775,919 to Pearsall et al. and U.S. Pat. No. 4,881,153 to Scott. The Pearsall device uses the motion of the wheel to generate electricity to activate Light Emitting Diodes (LEDs), while the Pearsall device provides another system for supporting and engagement of a contact ring.

Thus, a review of know devices reveals that there remains a need for a device or system that allows illumination of a rotating element, such as a the wheel on a vehicle, without requiring significant modifications to existing installations. For example, there remains a need for a system that does not require that the user drill or replace the wheel studs to provide a set of hollow studs that provide a route for current or support for a contact ring.

There remains a need for a system that allows illumination of the wheel without needing to modify existing components of the wheel mounting.

Still further, there remains a need for a wheel illumination system that can be added on to or attached to the existing wheel installation, and which can easily accommodate differences in vehicle structure.

Still further, there remains a need for a wheel illumination system that addresses the problems associated with heat generated due to the contact of the brushes against a moving surface. There remains a need for an illumination system that is light weight, and thus provides little opportunity for creating an imbalance on the wheel structure.

SUMMARY

It has been discovered that the problems left unanswered by known art can be solved by providing a wheel luminaire systems which includes:

- an insulated contact ring with connectors for mounting the ring directly to the wheel, so that the contact ring is supported from the wheel;
- a contact brush with a mounting bracket to support the contact brush at a location near the wheel; and
- light emitting devices which are electrically connected to the contact ring and grounded through the wheel, so that illumination of the wheel is carried out by creating a circuit from a power source on the vehicle, through the brush to the contact ring, and from the contact ring to the light emitting devices and back to the power source.

In a preferred embodiment of the invention the contact ring attaches to the outer rim of the internal portion of the wheel in a manner that is similar to the mounting of a vehicle hub cap. The ring will include a conductive portion which will be mounted over an insulating portion. In a highly preferred embodiment of the invention, the insulating portion will be made from an insulating foam material which will insulate the contact ring from thermal conductivity as well as electrical conductivity. Furthermore, it is contemplated that this insulating portion will also include an adhesive backing material that allows the contact ring to adhere to the wheel.

It is also contemplated that the brush may be of any known design. The mounting bracket will provide an adjustable support for the brush, and will preferably include attachment points for mounting the bracket to vehicle structure, so that the brush is held near the outer perimeter of the wheel. It is contemplated that this mounting bracket may include positions for mechanical fasteners or areas that include adhesives for mounting the bracket against the brake backing plate, for example. It is important to note that it is contemplated that the mounting bracket may also be mounted against other stationary structure near the outer rim of the wheel, and that the mounting to this structure may be carried out, as indicated above, with the use mechanical fastening devices such as ratcheting ties or the like.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which.

DETAILED DESCRIPTION OF PREFERRED EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
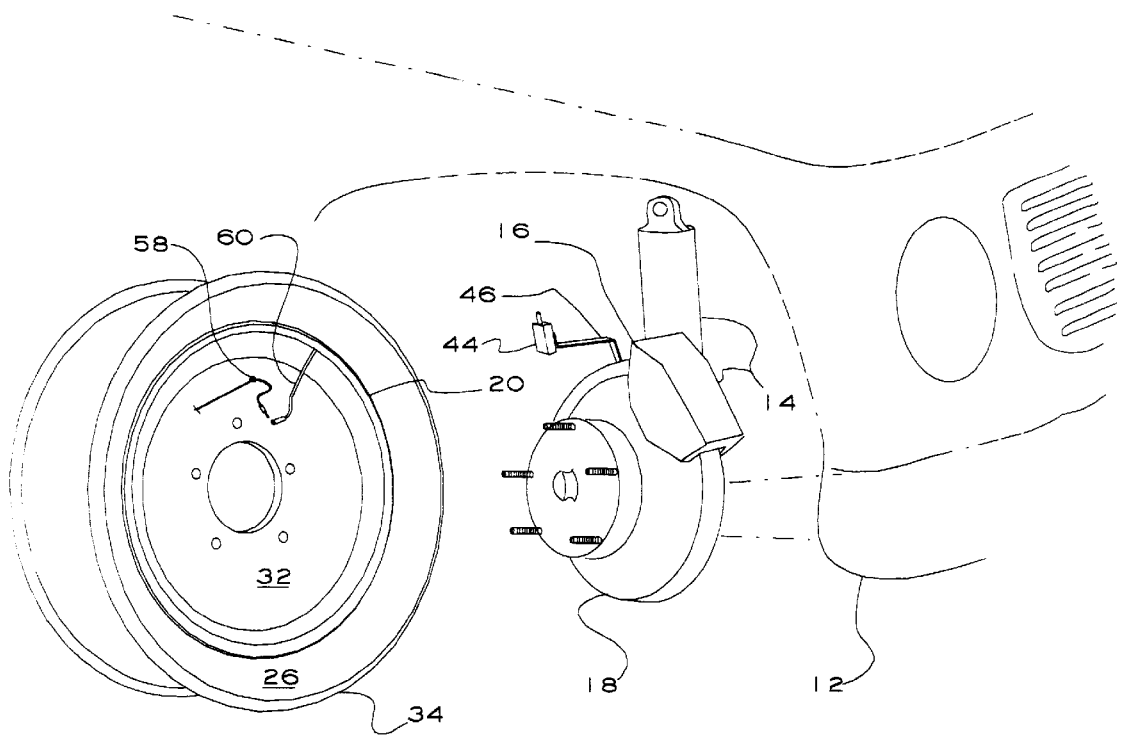
FIG. 1 is a perspective view of a preferred embodiment of the invention as used on an automobile.

Turning now to FIG. 1 where an illuminated wheel system 10 for use with an automobile 12 has been illustrated. It is contemplated that the system 10 will be used in conjunction with a vehicle which has an electrical power source as commonly found on automobiles. However, it is important to note that it is contemplated that the disclosed novel assemblies can be used on other applications, for example on toy cars, bicycles and the like, and even other rotating devices, such as electric fans and the like.

In a highly preferred embodiment of the invention, illustrated in FIG. 1, the system 10 is mounted on stationary structure 14 of the automobile 12. This stationary structure includes support structure which is used to retain components such as the brake calipers 16, found on applications which include brake rotors 18.

Figure 2:
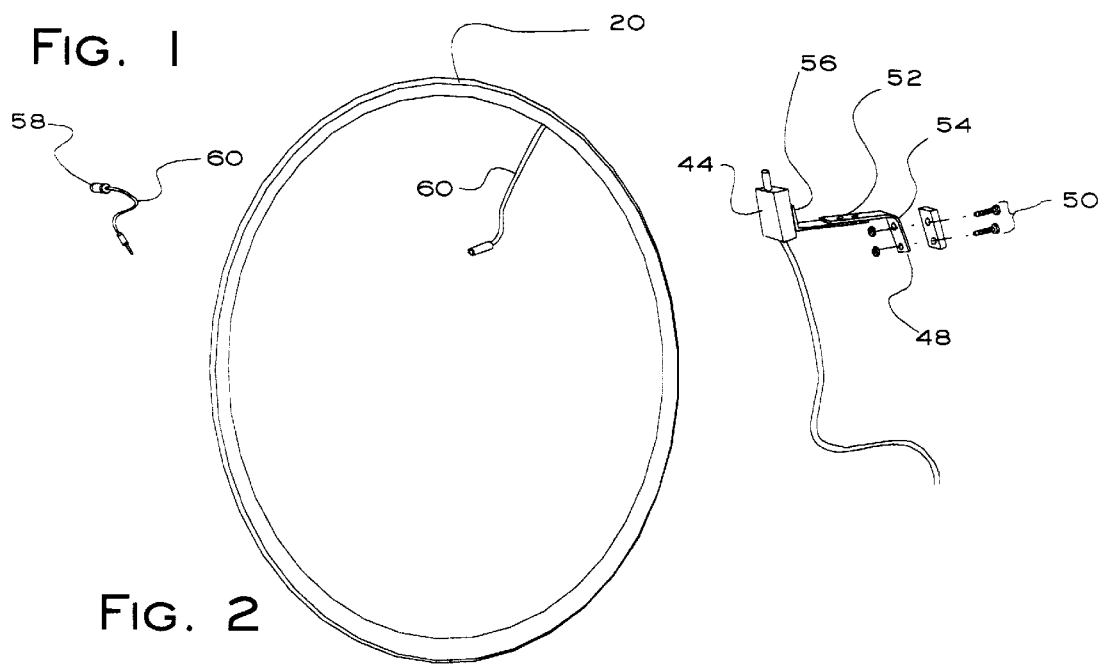
FIG. 2 illustrates important components of the invention, which are contemplated as being part of a kit.
Figure 3:
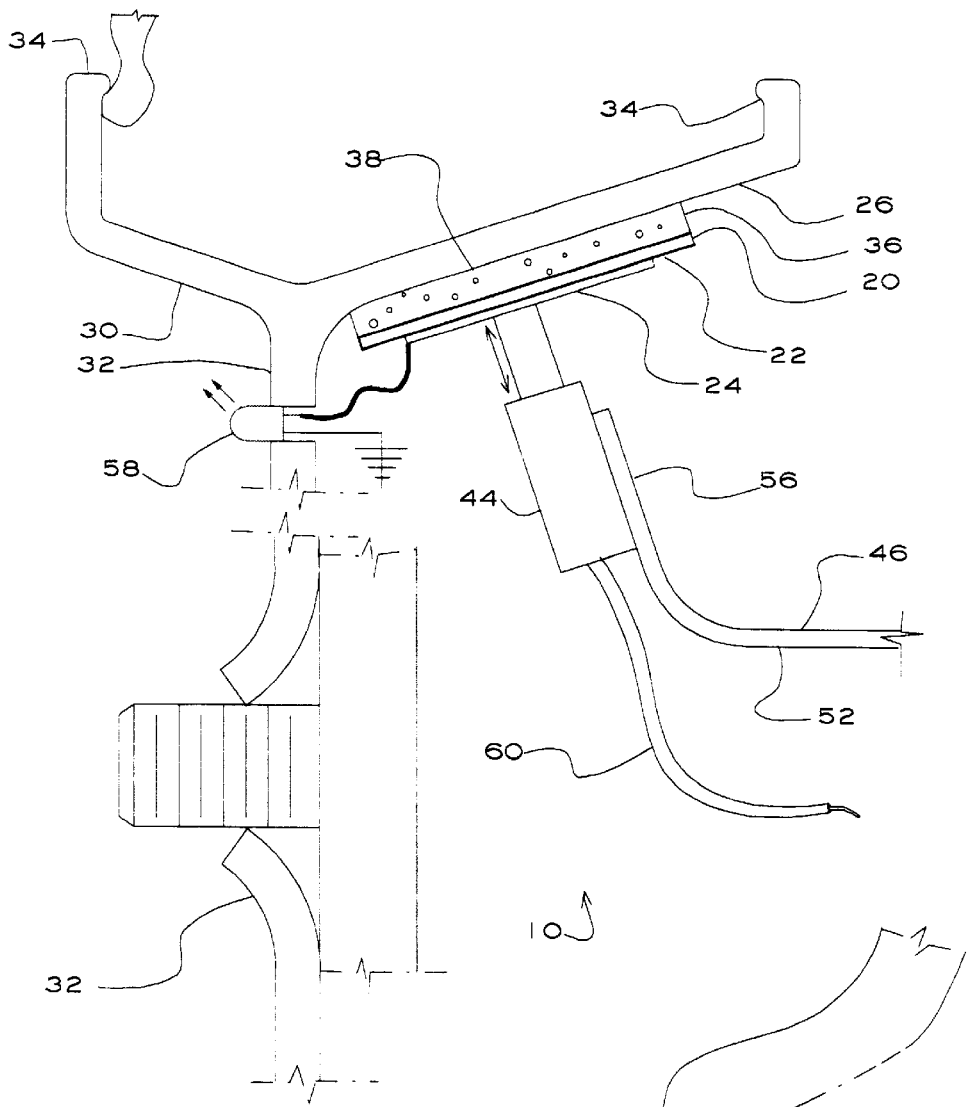
FIG. 3 is a sectional view of an embodiment of the invention, the view illustrating a section through a contact ring and illustrating the use of a foam backed contact ring mounted against the concave area of the wheel.
Figure 4:
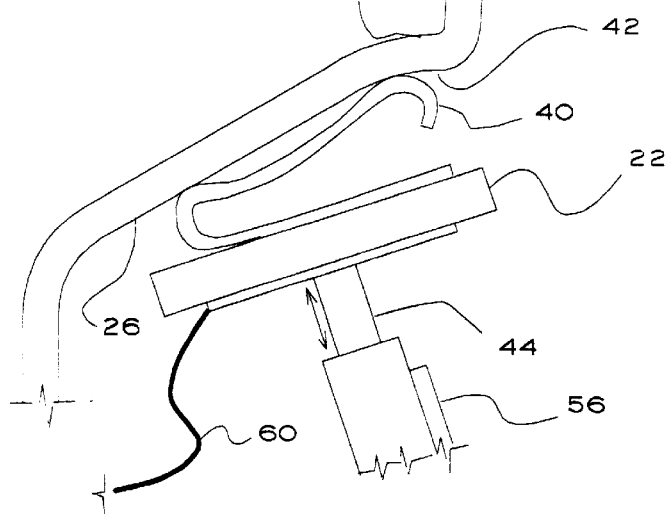
FIG. 4 is a view at a similar orientation as FIG. 3, and illustrating an embodiment of the invention using a spring to retain the contact ring against the concave portion of the wheel.

Turning to FIGS. 2 through 4 it will be understood that the disclosed system 10, will make use of a contact ring 20 which will include a circular backing ring 22. In a highly preferred embodiment of the invention the backing ring 22 is made of an electrically insulating material, such as a plastic material, for example PVC plastic, or a fiber reinforced polymer, such as sheet molding compound, an or the like. Over the backing ring 22 will be mounted a conductive layer 24 of an electrically conductive material, such as copper or other metals.

It is important to note that according to a highly preferred embodiment of the invention, the backing ring 22 will cooperate with the concave portion 26 of the wheel 30 of the automobile 12. It is contemplated that the wheel 30 will include a web portion 32, a rim portion 34, and the concave portion 26 between the rim portion 34 and the web portion 32. FIGS. 3 and 4 illustrate that it is contemplated that the backing ring 22 will include means for flexibly supporting the contact ring 20 from the concave portion 26 of the wheel 30. According to a highly preferred embodiment of the invention, the contact ring 20 will be supported through adhesive backed foam 36 which has been positioned in a radial manner about the backing ring 22. The adhesive backed foam 36 will preferably include a layer or area of adhesive 38, which may have been delivered to the end user with a peel away protective cover (not shown).

It has been discovered that by incorporating the layer of adhesive backed foam 36 to the contact ring 20 structure one achieves important new and useful results which could not be obtained with known devices. One such result is the provision of a thermal barrier between the contact ring 20 and the wheel 30. Another important result is that the foam backing acts as a flexible support which accommodates variations in wheel designs and manufacturing imperfections.

Turning to FIG. 4 it will be understood that it is also contemplated that the flexible support may be embodied in the form of springs 40, which are attached to the backing ring 22. The use of springs 40 to support the contact ring 20 from the wheel 30 would be particularly advantageous in applications where the system 10 is to be used with an automobile having steel wheels which include a bead 42 that extends inwards, into the concave area. However, it is important to note that the springs 40 are positioned in a radial manner about the backing ring 22, allowing attachment of the contact ring 20 against the concave portion, or inboard portion of the wheel 30.

As illustrated in the enclosed figures, the contact ring 20 will cooperate with a contact brush 44 that is mounted from the stationary structure 14 of the vehicle. In a highly preferred embodiment of the invention the contact brush 44 includes means 46 for mounting the contact brush from the stationary structure of the vehicle. In the illustrated exemplar embodiment shown in FIG. 2, these means 46 for mounting include a bracket 48 which has been adapted for accepting fasteners 50 that are used for clamping or attaching to the stationary structure. For example, in applications where the vehicle includes disk brakes, wheel 30 will surround the disk brakes and their respective actuating components, such as the brake caliper 16. In such an application, it is contemplated that the fasteners 50 and bracket 48 will attach directly to the caliper 16. The attachment to the caliper 16 is exemplary only, and it is contemplated that various configurations of the bracket 48 could be used to support the contact brush 44 from the stationary structure of the vehicle. In a preferred embodiment of the configuration of the means 46 for mounting the brush 44 should include an adjustable arm 52 having a first end 54 and a second end 56. Preferably, the first end 54 will include means for attaching the adjustable arm 52 to the stationary structure 14 of the vehicle. It is contemplated that these means include brackets, clamps, or other attachment components such as adhesives and the like. The second end 56 will include means, such as mechanical fasteners or adhesives, for supporting the contact brush 44. This structure will allow the means 46 for mounting the brush to support the brush 44 over the moving parts, such as the rotor 18, at a position that will allow the brush 44 to make contact with the layer of electrically conductive material 24 on the contact ring 20.

Referring once again to FIG. 3, it will be understood that the it is contemplated that at least one electrical light emitting device 58. In a highly preferred embodiment of the invention the light emitting device 58 includes at least one light emitting diode, LED, which is electrically connected to the layer of electrically conductive material 24 on the contact ring 20 by way of a wire 60 or the like. It will be understood that this arrangement will allow electrical power from the power source in the vehicle to reach the light emitting device 58.

It is important to note that the preferred use of LEDs as the electrical light emitting devices 58 serves to allow the disclosed system to be sold as a kit, which would allow the user to modify a wheel to include illumination, including flashing lights and so on. The use of LEDs will allow a relatively innocuous modification of an existing wheel. This is due in large part to the fact that only relatively minute modifications need to be made to the wheel in order to mount an LED on or through the wheel. Additionally, it has been discovered that LEDs can withstand the forces imposed by the rotation of the wheel.

Figure 5:
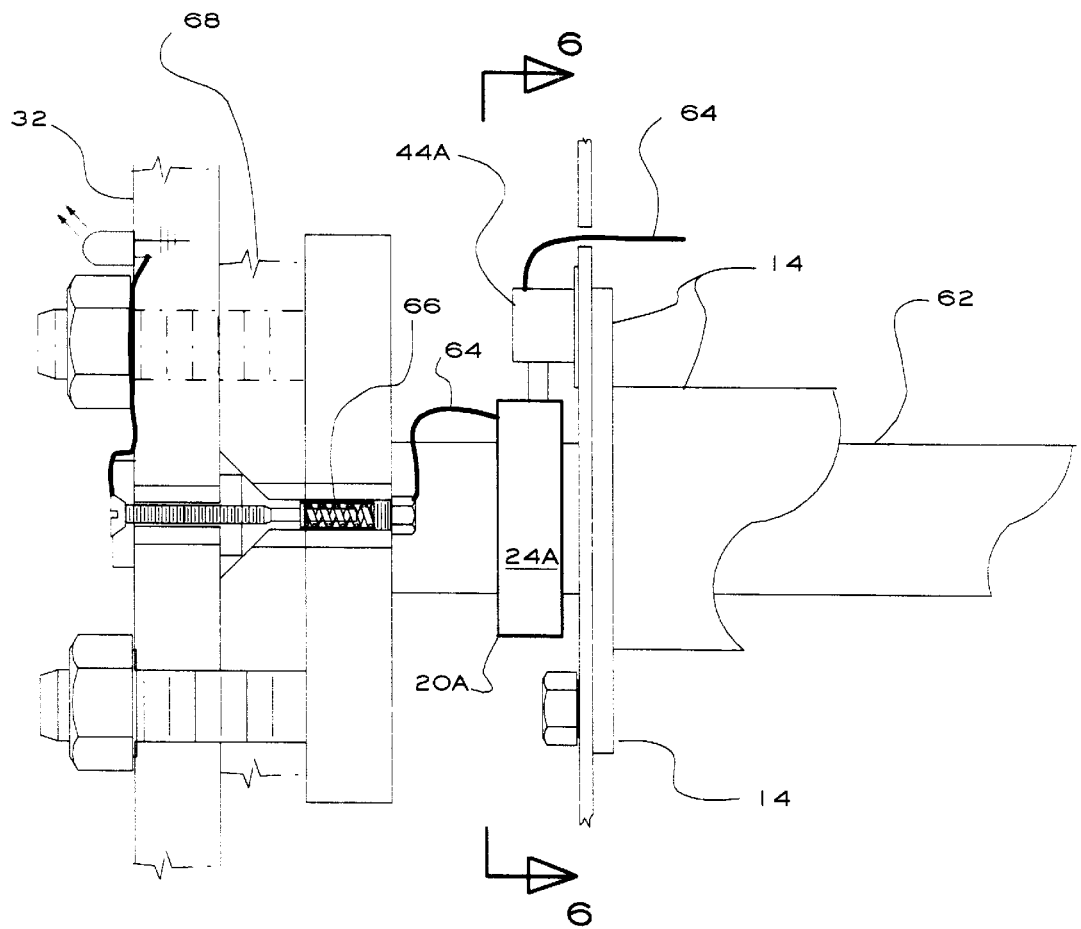
FIG. 5 is a sectional view of an embodiment of the instant invention, and showing the mounting of a contact ring against a rotatable axle or shaft on the vehicle.
Figure 6:
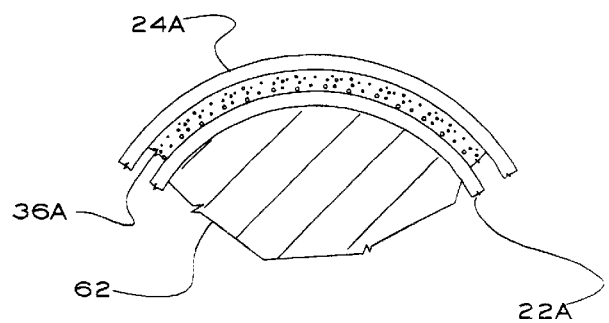
FIG. 6 is a section view taken from FIG. 5, as indicated on FIG. 5, and illustrating the assembly of a configuration of the contact ring.

Turning now to FIGS. 5 and 6 it will be understood that in yet another embodiment of the disclosed invention, the contact ring 20A will be adapted for mounting over a rotating shaft or axle 62. In this embodiment the contact ring 20A will include a backing ring 22A which supports a foam backing 36A. Additionally, the contact ring 20A will include a conductive layer 24A of a conductive material, preferably copper. The foam backing 36A may be positioned directly against the rotating axle 62 or between the backing ring 22A and the conductive layer 24A, in which case the conductive layer 24A would need to exhibit a degree of rigidity sufficient to withstand continuous contact with the brush 44A.

Thus, in the embodiment illustrated in FIG. 5, the brush 44A is mounted from a stationary structure 14 of the vehicle.

Therefore, electrical current flows through the brush 44A, to the conductive layer 24A and to a conductor wire 64. The wire 64 then extends to a connector 66 that transmits current through a drum 68 on a drum brake system. It is preferred that the connector 66 insulate the current path, to avoid grounding through the brake drum 68. Additionally, it is preferred that the connector 66 accommodate a mating connector 70 which is mounted on the wheel 30, and which provides a current path to LEDs mounted on the wheel 30.

In the embodiment illustrated in FIGS. 5 and 6 the backing ring 22A is made from a section of resilient plastic material having a gap 72 about its perimeter. The gap 72 has been adapted for allowing the installer to expand the backing ring 22A to place the backing ring 22A over the rotating axle 62. This variation is slightly different from the embodiment illustrated in FIGS. 1–4, where the contact ring 20, together with the backing ring 22 and other components, are made as a single ring which mounts against the concave portion 26 of the wheel 30, in a manner similar to the mounting of what is commonly called a "beauty ring" used for decorative purposes on the outboard side of a wheel.

Thus, it can be appreciated that the disclosed invention, with its means for flexibly supporting the contact ring from a rotating component such as the wheel or shaft, also allows mounting of the disclosed contact ring from other rotating components, such as bicycle wheels, wheels on toy cars, electric fans, and the like due to the system's ability to obviate the effects of imperfections in flatness or contour. The variations in flatness or contour being taken up by the means for flexibly supporting said contact ring.

Thus it can be appreciated that the above described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A system for illuminating a wheel on a vehicle, the wheel having a concave area adapted for mounting around a wheel hub attached to stationary structure on the vehicle, the vehicle having an electrical power source, the system comprising:

a contact ring comprising:

a circular backing ring, said backing ring being defined from an insulating foam material, the foam material having a section of adhesive adapted for attachment to the concave area of the wheel; and a layer of electrically conductive material against the backing ring;

a contact brush having means for mounting the contact brush from the stationary structure of the vehicle so that the contact brush makes contact with the layer of electrically conductive material on said contact ring;

at least one electrical light emitting device, the light emitting device being electrically connected to the layer of electrically conductive material on said contact ring, so that electrical power from the power source reaches the light emitting device through the contact brush and through the contact ring.

2. A system according to claim 1 wherein said layer of electrically conductive material over the backing ring comprises a metal ring attached to said backing ring.

3. A system according to claim 1, wherein said light emitting devices comprise at least one light emitting diode.

4. A system according to claim 1, wherein said means for mounting the contact brush from the stationary structure of the vehicle comprises an adjustable arm having a first end and a second end, the first end having means for attaching the adjustable arm to the stationary structure of the vehicle and the second end having means for supporting the contact brush.

5. A system according to claim 5 wherein the system has been adapted for use on a vehicle with brake rotors, and the means for mounting the contact brush from the stationary structure of the vehicle extends over at least one of the vehicle brake rotors.

6. An illuminated wheel system for use with an automobile having an electrical power source, wheel hubs mounted on stationary structure of the vehicle and brake rotors, the illuminated wheel system comprising:
 a wheel having a rim portion adapted for receiving a tire, a web portion adapted mounting against the wheel support hub of the vehicle, and a concave portion extending between the web portion and the rim portion;
 at least one light emitting device mounted in the web portion of said wheel;
 a contact ring comprising:
  a circular backing ring, said backing ring being defined from an insulating foam material, the foam material having a section of adhesive attaching the backing ring directly to the concave area of the wheel; and
  a layer of electrically conductive material against the backing ring;
  a contact brush having means for mounting the contact brush from the stationary structure of the vehicle so that the contact brush makes contact with the layer of electrically conductive material on said contact ring;
 means for electrically said light emitting device to the layer of electrically conductive material on said contact ring, so electrical power from the power source reaches the light emitting device through the contact brush and through the contact ring.

7. A system according to claim 6, wherein said layer of electrically conductive material over the backing ring comprises a metal ring.

8. A system according to claim 6, wherein said light emitting devices comprise at least one light emitting diode.

9. A system according to claim 6, wherein means for mounting the contact brush from the stationary structure of the vehicle has been adapted for mounting over the brake rotors of the vehicle.

10. A system for illuminating a wheel to be used on a vehicle, the wheel having a web portion adapted for attaching the wheel to the vehicle, the vehicle having an electrical power source and brakes mounted on a rotating axle, the rotating axle being supported by stationary structure on the vehicle, system comprising:
 a light emitting device mountable on the web portion of the wheel;
 a contact ring comprising:
  a circular backing ring of an electrically insulating foam having an adhesive area that allows mounting of the contact ring against the rotating axle; and
  a layer of electrically conductive material against the backing ring;
  a contact brush having means for mounting the contact brush from the stationary structure of the vehicle so that the contact brush makes contact with the layer of electrically conductive material on said contact ring as the rotating axle turns;
 means for providing electrical communication between said light emitting device to the layer of electrically conductive material on said contact ring, so that electrical power from the power source reaches the light emitting device through the contact brush and through the contact ring.

11. A system according to claim 10 wherein said foam support portion is radially positioned between the backing ring and the axle.

12. A system according to claim 11, wherein said light emitting device comprise at least one light emitting diode.

13. A system according to claim 12, wherein said means for mounting the contact brush from the stationary structure of the vehicle comprises an adjustable arm having a first end and a second end, the first end having means for attaching the adjustable arm to the stationary structure of the vehicle and the second end having means for supporting a contact brush.

* * * * *